(12) United States Patent
Taguchi et al.

(10) Patent No.: US 7,066,989 B2
(45) Date of Patent: Jun. 27, 2006

(54) INKJET INK, PRODUCTION METHOD OF INKJET INK, INKJET INK SET AND INKJET RECORDING METHOD

(75) Inventors: Toshiki Taguchi, Shizuoka (JP); Manabu Ogawa, Shizuoka (JP); Yoshihisa Tsukada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 30 days.

(21) Appl. No.: 10/750,863

(22) Filed: Jan. 5, 2004

(65) Prior Publication Data

US 2004/0134381 A1  Jul. 15, 2004

(30) Foreign Application Priority Data

Jan. 8, 2003  (JP) ................. P. 2003-002311
Jan. 8, 2003  (JP) ................. P. 2003-002407

(51) Int. Cl.
 *C09D 11/02* (2006.01)
 *B41J 2/01* (2006.01)

(52) U.S. Cl. ................. 106/31.43; 347/100

(58) Field of Classification Search ............. 106/31.43; 347/100
 See application file for complete search history.

(56) References Cited

U.S. PATENT DOCUMENTS

| | | | | |
|---|---|---|---|---|
| 5,431,722 A | * | 7/1995 | Yamashita et al. | 106/31.43 |
| 5,462,590 A | * | 10/1995 | Yui et al. | 106/31.43 |
| 5,624,484 A | * | 4/1997 | Takahashi et al. | 106/31.75 |
| 5,626,655 A | * | 5/1997 | Pawlowski et al. | 106/31.27 |
| 5,810,916 A | | 9/1998 | Gundlach et al. | |
| 5,891,232 A | | 4/1999 | Moffatt et al. | |
| 5,973,026 A | | 10/1999 | Burns et al. | |
| 6,048,390 A | * | 4/2000 | Yano et al. | 106/31.43 |
| 6,102,997 A | | 8/2000 | Helling et al. | |
| 6,827,771 B1 | * | 12/2004 | Omatsu et al. | 106/31.47 |
| 2002/0096082 A1 | * | 7/2002 | Omatsu et al. | 106/31.5 |
| 2004/0011248 A1 | * | 1/2004 | Taguchi et al. | 106/31.28 |
| 2004/0194660 A1 | * | 10/2004 | Taguchi et al. | 106/31.43 |
| 2005/0126434 A1 | * | 6/2005 | Feldkamp | 106/31.43 |

FOREIGN PATENT DOCUMENTS

| | | |
|---|---|---|
| EP | 0 526 011 A1 | 2/1993 |
| EP | 0 924 272 A1 | 6/1999 |
| EP | 1 213 331 A1 | 6/2002 |
| EP | 1 375 608 A1 | 1/2004 |
| JP | 55-043153 A | 3/1980 |
| JP | 57-057760 A | 4/1982 |
| JP | 05-132643 A | 5/1993 |
| JP | 06-136309 A | 5/1994 |
| JP | 07-150086 A | 6/1995 |
| JP | 08-302253 A | 11/1996 |
| JP | 09-111164 A | 4/1997 |
| JP | 09-151347 A | 6/1997 |
| JP | 09-151348 A | 6/1997 |
| JP | 2000-136335 A | 5/2000 |
| JP | 2001-139854 A | 5/2001 |
| JP | 2001-207096 A | 7/2001 |
| JP | 2002-002098 A | 1/2002 |
| JP | 2002-179958 A | 6/2002 |
| WO | WO01/62859 A2 | 8/2001 |

OTHER PUBLICATIONS

European Search Report dated Mar. 8, 2004.

* cited by examiner

*Primary Examiner*—Helene Klemanski
(74) *Attorney, Agent, or Firm*—Sughrue Mion, PLLC

(57) ABSTRACT

An inkjet ink comprising a dye, water, a water-miscible organic solvent and at least one compound selected from an amino acid derivative containing an oil-soluble group having 6 or more carbon atoms and a metal chelating compound containing an oil-soluble group having 6 or more carbon atoms.

9 Claims, No Drawings

INKJET INK, PRODUCTION METHOD OF INKJET INK, INKJET INK SET AND INKJET RECORDING METHOD

FIELD OF THE INVENTION

The present invention relates to an inkjet ink, an inkjet ink set and an inkjet recording method, which ensure excellent durability of images under high-humidity conditions.

BACKGROUND OF THE INVENTION

With the recent popularization of computers, an inkjet printer is widely used for printing letters or images on paper, film, cloth or the like not only at offices but also at homes.

The inkjet recording method includes a system of ejecting a liquid droplet by applying a pressure using a piezoelectric element, a system of ejecting a liquid droplet by generating a bubble in ink by heat, a system of using an ultrasonic wave, and a system of ejecting a liquid droplet by drawing by an electrostatic force. The ink composition used for such inkjet recording methods includes an aqueous ink, an oily ink and a solid (melt-type) ink. Among these inks, the aqueous ink becomes mainstream in view of production, handleability, odor, safety and the like.

The coloring agent used in such an ink for ink-jet recording method is required to have high solubility in a solvent, enable high-density recording, have good color hue, exhibit excellent fastness to light, heat, air, water and chemicals, ensure good fixing property and less blurring on an image-receiving material, provide ink having excellent storability, shows no toxicity, have high purity, and be available at a low cost. However, it is very difficult to find out a coloring agent satisfying these requirements in a high level. Although various dyes and pigments for inkjet recording method have been already proposed and actually used, a coloring agent satisfying all requirements is not yet found out at present. Conventionally well-known dyes and pigments having a Colour Index (C.I.) number can hardly satisfy both color hue and fastness required of the ink for inkjet recording method. Various studies have been made on dyes having both good color hue and fastness with an attempt to develop a dye excellent as the coloring agent for inkjet recording method. However, a water-soluble group is necessarily substituted on a compound as a water-soluble dye. When the number of water-soluble groups is increased so as to improve the stability of ink, it has been found to cause a problem in that the image formed is readily blurred under high-humidity conditions.

SUMMARY OF THE INVENTION

An object of the present invention is to provide an inkjet ink, a production method of an inkjet ink, an ink-jet ink set and an inkjet recording method, where the image formed is less blurred even under high-humidity conditions.

Other objects of the invention will become apparent from the following description.

The objects of the present invention have been attained by the following means.

1) An inkjet recording ink composition comprising a dye, water, a water-miscible organic solvent and at least one compound selected from an amino acid derivative containing an oil-soluble group having 6 or more carbon atoms and a metal chelating compound containing an oil-soluble group having 6 or more carbon atoms. The dye is preferably a water-soluble dye.

2) A concentrated inkjet recording ink comprising a dye, water, a water-miscible organic solvent and at least one compound selected from an amino acid derivative containing an oil-soluble group having 6 or more carbon atoms and a metal chelating compound containing an oil-soluble group having 6 or more carbon atoms. The dye is preferably a water-soluble dye.

3) The ink as described in 1) or the concentrated ink as described in 2), wherein the amino acid derivative is a compound represented by formula (A) shown below. 4) A method of producing an inkjet recording ink comprising producing the ink described in 1) using the concentrated ink described in 2) or 3).

5) An ink set for inkjet recording comprising at least one inkjet recording ink described in 1) and/or 2).

6) An inkjet recording method comprising recording an image by an inkjet printer using the inkjet recording ink described in 1) and/or 2) and/or the ink set described in 5).

DETAILED DESCRIPTION OF THE INVENTION

The present invention is described in detail below.

The inkjet ink of the present invention is characterized by containing an amino acid derivative having an oil-soluble group or a metal chelating compound having an oil-soluble group.

The amino acid as used herein includes not only an amino acid in a narrow sense classified as a constituent unit of a biomolecule but also a compound having a basic nitrogen atom and a proton-dissociating substituent in its molecule.

Examples of the fundamental skeleton of the former include glycine, lysine, trysine, vicine, alanine, valine, leucine, isoleucine, β-alanine, serine, isoserine, threonine, proline, ornithine, glutamic acid, aspartic acid, inosinic acid, cysteine, methionine, taurine and cystine.

Examples of the fundamental skeleton of the latter include compounds over a wide range, for example, aminoacetic acid, iminodiacetic acid, nitrilotriacetic acid, aminoadipic acid, pipecolic acid, picolinic acid, nicotinic acid, quinolinic acid, phenylglycine, aminobenzoic acid, aminophthalic acid, dimethylaminobenzoic acid and diethylaminobenzoic acid.

Furthermore, polymer compounds having an amino group and a carboxyl or sulfo group in their molecules can also be preferably used in the present invention. When classified by the structure of main chain, the polymer compound may be selected from various polymers, for example, vinyl polymerization polymers, polyether-type polymers, polyester-type polymers, polyaromatics (including heterocyclic ring) and polyamine-type polymers, however, in the present invention, the vinyl polymerization polymers, polyether-type polymers and polyamine-type polymers are preferably used. Among them, water-soluble polymers which can be present as an aqueous solution of 10 wt % or more, fine particle dispersion polymers dispersed in water, and latex polymers formed by emulsion polymerization can be preferably used.

Specific examples of the polymer which can be used include various polymers, for example, polyacrylic acid, polymethacrylic acid, polyvinylamine, polyallylamine, polyimine, polyvinyl alcohol, polyhydroxyethyl acrylate, polyhydroxyethyl methacrylate, polyethylene glycol, polyvinylpyridine and a polystyrene derivative having a quaternary ammonium group as a substituent. Furthermore, copolymers thereof, copolymers with a monomer having an amino acid structure, and copolymers with various known monomers can be preferably used.

The amino acid for use in the present invention is characterized in that an oil-soluble group having 6 or more carbon atoms is substituted thereon. Examples of the oil-soluble group include an alkyl group, an aryl group and a group having an alkyl or aryl group in the partial structure. The number of carbon atoms is preferably from 6 to 40, more preferably from 8 to 20.

In the case of a low molecular weight compound, compounds having one or more oil-soluble groups in their molecules are preferred. In the case of a high molecular weight compound, the oil-soluble group may be contained in the amino acid monomer unit or in a monomer unit copolymerized with the amino acid monomer unit. In the case of copolymerization, assuming that the entire is 100%, the ratio of a monomer unit having the oil-soluble group is from 0.01 to 99%, preferably from 0.1 to 90% in terms of the polymerization molar ratio.

In the amino acid for use in the present invention, various substituents can be substituted in addition to the oil-soluble group. These substituents may be substituted separately from the oil-soluble group or may be further substituted on the oil-soluble group. Examples of the substituent include an alkyl group (preferably having from 1 to 20 carbon atoms, more preferably from 1 to 12 carbon atoms, still more preferably from 1 to 8 carbon atoms, e.g., methyl, ethyl, iso-propyl, tert-butyl, n-octyl, n-decyl, n-hexadecyl, cyclopropyl, cyclopentyl or cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl or 3-pentenyl), an alkynyl group (preferably having from 2 to 20 carbon atoms, more preferably from 2 to 12 carbon atoms, still more preferably from 2 to 8 carbon atoms, e.g., propargyl or 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl or naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino or dibenzylamino), an alkoxy group (preferably having from 1 to 20 carbon atoms, more preferably from 1 to 12 carbon atoms, still more preferably from 1 to 8 carbon atoms, e.g., methoxy, ethoxy or butoxy), an aryloxy group (preferably having from 6 to 20 carbon atoms, more preferably from 6 to 16 carbon atoms, still more preferably from 6 to 12 carbon atoms, e.g., phenyloxy or 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl or pivaloyl), an alkoxycarbonyl group (preferably having from 2 to 20 carbon atoms, more preferably from 2 to 16 carbon atoms, still more preferably from 2 to 12 carbon atoms, e.g., methoxycarbonyl or ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy or benzoyloxy), an acylamino group (preferably having from 2 to 20 carbon atoms, more preferably from 2 to 16 carbon atoms, still more preferably from 2 to 10 carbon atoms, e.g., acetylamino or benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms, more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methanesulfonylamino or benzenesulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl or phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl or phenylcarbamoyl), an alkylthio group (preferably having from 1 to 20 carbon atoms, more preferably from 1 to 16 carbon atoms, still more preferably from 1 to 12 carbon atoms, e.g., methylthio or ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl or tosyl), a sulfinyl group (preferably having from 1 to 20 carbon atoms, more preferably from 1 to 16 carbon atoms, still more preferably from 1 to 12 carbon atoms, e.g., methanesulfinyl or benzenesulfinyl), a ureido group (preferably having from 1 to 20 carbon atoms, more preferably from 1 to 16 carbon atoms, still more preferably from 1 to 12 carbon atoms, e.g., ureido, methylueido or phenylureido), a phosphoric acid amido group (preferably having from 1 to 20 carbon atoms, more preferably from 1 to 16 carbon atoms, still more preferably from 1 to 12 carbon atoms, e.g., diethylphosphoric acid amido or phenylphosphoric acid amido), a hydroxy group, a mercapto group, a halogen atom (e.g., fluorine, chlorine, bromine or iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms; examples of the heteroatom include a nitrogen atom, an oxygen atom and a sulfur atom; specific examples of the heterocyclic group include imidazolyl, pyridyl, quinolyl, furyl, thienyl, piperidyl, morpholino, benzoxazolyl, benzimidazolyl, benzothiazolyl, carbazolyl and azepinyl), and a silyl group (preferably having from 3 to 40 carbon atoms, more preferably from 3 to 30 carbon atoms, still more preferably from 3 to 24 carbon atoms, e.g., trimethylsilyl or triphenylsilyl). These substituents each may be further substituted. When two or more substituents are present, these may be the same or different. If possible, these substituents may combine with each other to form a ring.

Of the amino acid derivatives for use in the present invention, a compound represented by the following formula (A) or a compound represented by the following formula (B) is preferably used.

Formula (A)

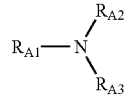

wherein $R_{A1}$ represents an alkyl group having 6 or more carbon atoms (preferably from 6 to 40 carbon atoms), $R_{A2}$ and $R_{A3}$ each represent an alkyl group (preferably having from 1 to 20 carbon atoms, more preferably from 1 to 12 carbon atoms), a carboxyalkyl group (preferably having from 1 to 4 carbon atoms) or a sulfoalkyl group (preferably having from 1 to 4 carbon atoms), and at least one of $R_{A2}$ and $R_{A3}$ is a carboxyalkyl group or a sulfoalkyl group. The carboxy group and the sulfo group in the carboxyalkyl group and the sulfoalkyl group may be in the form of respective salts (the same is also applied to $R_{A5}$ and $R_{A6}$ below).

It is preferred that $R_{A1}$ is an alkyl group having from 8 to 20 carbon atoms and $R_{A2}$ and $R_{A3}$ each is an alkyl group having from 1 to 12 carbon atoms or a carboxyalkyl group having from 1 to 4 carbon atoms.

Formula (B):

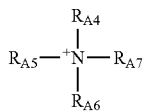

wherein $R_{A4}$ represents an alkyl group having 6 or more carbon atoms (preferably from 6 to 40 carbon atoms), $R_{A5}$ and $R_{A6}$ each represent an alkyl group (preferably having from 1 to 20 carbon atoms, more preferably from 1 to 12 carbon atoms), a carboxyalkyl group (preferably having from 1 to 4 carbon atoms) or a sulfoalkyl group (preferably having from 1 to 4 carbon atoms), and $R_{A7}$ represents a $COO^-$-containing alkyl group or an $SO_3^-$-containing alkyl group.

It is preferred that $R_{A4}$ is an alkyl group having from 8 to 20 carbon atoms, $R_{A5}$ and $R_{A6}$ each is an alkyl group having from 1 to 12 carbon atoms, and $R_{A7}$ is a $COO^-$-containing alkyl group (preferably having from 1 to 2 carbon atoms).

The metal chelating compound having an oil-soluble group, which is used for the inkjet ink of the present invention, is described below.

The metal as used herein means mainly a transition metal. The chelating compound means a group of compounds, which can form an ionic bond or a coordinate bond with a metal. Examples of the compound having such a function include organic compounds having a dissociating functional group capable of forming an ionic bond with metal ion. Examples of the dissociating functional group include a hydroxy group, a thiol group, a sulfonamido group, an imido group, a carboxyl group, a sulfo group, a phosphoric acid group and a phosphonic acid group. Other examples of the compound include those containing a group having an unshared electron pair capable of forming a coordinate bond. Examples of such a group include an ether group, a thioether group, an amino group, and a nitrogen atom of heterocyclic ring.

Also, a chelating agent having a composite effect of these compounds containing such a group is particularly preferably used.

As the metal chelating compound, various compounds are known.

Examples thereof include aliphatic or aromatic carboxylic acids, dicarboxylic acids, tricarboxylic or greater polycarboxylic acids, oxycarboxylic acids, ketocarboxylic acids, thiocarboxylic acids, aromatic aldehydes, amine-base compounds, diamine compounds, polyamine compounds, aminopolycarboxylic acids, nitrilo-triacetic acid derivatives, ethylenediaminepolycarboxylic acids, heterocyclic carboxylic acids, heterocyclic rings, pyrimidines, nucleosides, purine bases, β-diketones and oxines. Among these, aminopolycarboxylic acids (preferably ethylenediaminepolycarboxylic acids) and chelating agents where a lone pair of nitrogen atoms can act as a donor are preferred.

Examples of such a compound include many known compounds, for example, phthalic acid, phthalonic acid, salicylic acid, thiosalicylic acid, picolinic acid, quinolinic acid, 2,6-dipicolinic acid, biphenyl-2,2'-dicarboxylic acid, oxine, 2-hydroxypyridine, pyrazinecarboxylic acid, ethylenediamine, diethylenetriamine, triethylenetetramine, glycine, 3-aminopropionic acid, iminodiacetic acid, iminotriacetic acid, ethylenediaminetetraacetic acid, propylenediaminetetraacetic acid, butylenediaminetetraacetic acid and 1,10-phenanthroline. Further, examples of metal chelating agents are described in Kagehira Ueno (compiler), *EDTA-Complexan no Kagaku* (*Chemistry of EDTA Complexane*), List of Complexanes (see attached lists), Nankodo (Apr. 15, 1977), and Takeichi Sakaguchi and Kagehira Ueno (compilers), *Kinzoku Chelate [III]* (*Metal Chelate [III]*), supplement (list of stability constants), Nankodo (Feb. 20, 1967). Among these metal chelating compounds, those containing an oil-soluble group having 6 or more carbon atoms can be preferably used in the present invention.

Preferred aminopolycarboxylic acids are characterized by having $=N-CH_2COOH$ (X1), $=N-CH_2CH_2COOH$ (X2), $=N-CH(CH_3)COOH$ (X3) or the like in the compound, and an $R_kNX$ type compound (wherein X represents (X1), (X2) or (X3)), an $R_k-NX-CH_2CH_2-NX-R_k$ type compound, an $R_k-NX-CH_2CH_2-NX_2$ type compound and an $X_2N-R-NX_2$ type compound are preferably used. In the above formulae, $R_k$ represents an oil-soluble group having from 6 to 40 carbon atoms (preferably from 8 to 20 carbon atoms) and plural $R_k$ groups may be present on the nitrogen atom. R represents an alkylene group having from 6 to 40 carbon atoms (preferably from 8 to 20 carbon atoms)

Further, polymer compounds as described below containing an oil-soluble group having 6 or more carbon atoms (when the polymer compounds do not have an oil-soluble group having 6 or more carbon atoms, the oil-soluble group having 6 or more carbon atoms is introduced) are preferably used.

Polymer compounds having a functional group capable of interacting with metal ion, namely, the group described above, for example, a hydroxy group, a thiol group, a sulfonamido group, an imido group, a carboxyl group, a sulfo group, a phosphoric acid group, a phosphonic acid group, an ether group, a thioether group, an amino group or a nitrogen atom of heterocyclic ring.

When classified by the structure of main chain, the polymer compound may be selected from various polymers, for example, vinyl polymerization polymers, polyether-type polymers, polyester-type polymers, polyaromatics (including heterocyclic ring) and polyamine-type polymers, however, in the present invention, the vinyl polymerization polymers, polyether-type polymers and polyamine-type polymers are preferably used. Among them, water-soluble polymers which can be present as an aqueous solution of 10 wt % or more, fine particle dispersion polymers dispersed in water, and latex polymers formed by emulsion polymerization can be preferably used. Also, polymers where the above-described group which functions as a chelating agent is contained as a partial structure are particularly preferred.

Specific examples of the polymer which can be used include various polymers, for example, polyacrylic acid, polymethacrylic acid, polyvinylamine, polyallylamine, polyimine, polyvinyl alcohol, polyhydroxyethyl acrylate, polyhydroxyethyl methacrylate, polyethylene glycol, polyvinylpyridine and a polystyrene derivative having a quaternary ammonium group as a substituent. Furthermore, copolymers thereof, copolymers with a monomer having a chelating agent structure, and copolymers with various known monomers can be preferably used.

The metal chelating compound for use in the present invention is characterized in that an oil-soluble group having 6 or more carbon atoms is substituted thereon. Examples of the oil-soluble group include an alkyl group, an aryl group and a group having an alkyl or aryl group in the partial structure. The number of oil-soluble groups is from 1 to 10 (preferably from 1 to 4, more preferably 1 or 2, still more preferably 1). The number of carbon atoms in one oil-soluble group is preferably from 6 to 40, more preferably from 8 to 20.

In the case of a low molecular weight compound, compounds having from 1 to 4 (preferably 1 or 2, more preferably 1) oil-soluble groups in their molecules are preferred. In the case of a high molecular weight compound, the oil-soluble group may be contained in the monomer unit having a chelating property or in a monomer unit copolymerized with the monomer unit having a chelating property. In the case of copolymerization, assuming that the entire is 100%, the ratio of a monomer unit having the oil-soluble group is from 0.01 to 99%, preferably from 0.1 to 90% in terms of the polymerization molar ratio.

In the metal chelating compound for use in the present invention, various substituents can be substituted in addition to the functional group capable of interacting with metal ion and the oil-soluble group. These substituents (the substituent may form a functional group capable of interacting with metal ion) may be substituted separately from the oil-soluble group or may be substituted on the oil-soluble group. Examples of the substituent are the same as those described for the amino acid above.

Preferred examples of the amino acid derivative and metal chelating compound for use in the present invention are set forth below, however, the present invention should not be construed as being limited thereto.

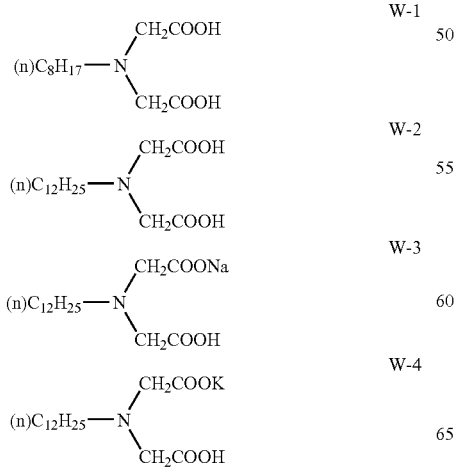

-continued

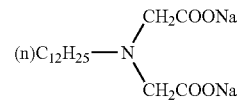

W-5

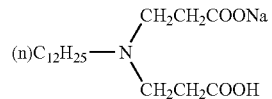

W-6

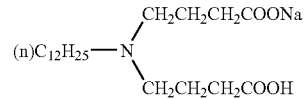

W-7

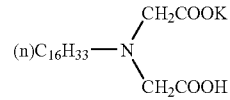

W-8

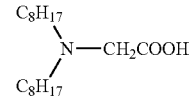

W-9

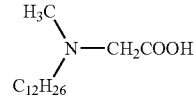

W-10

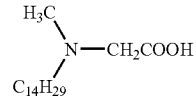

W-11

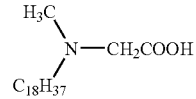

W-12

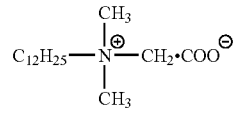

W-13

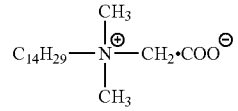

W-14

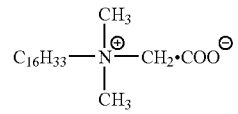

W-15

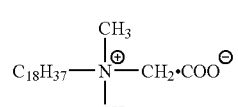

W-16

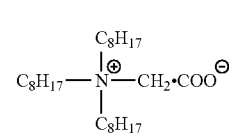

W-17

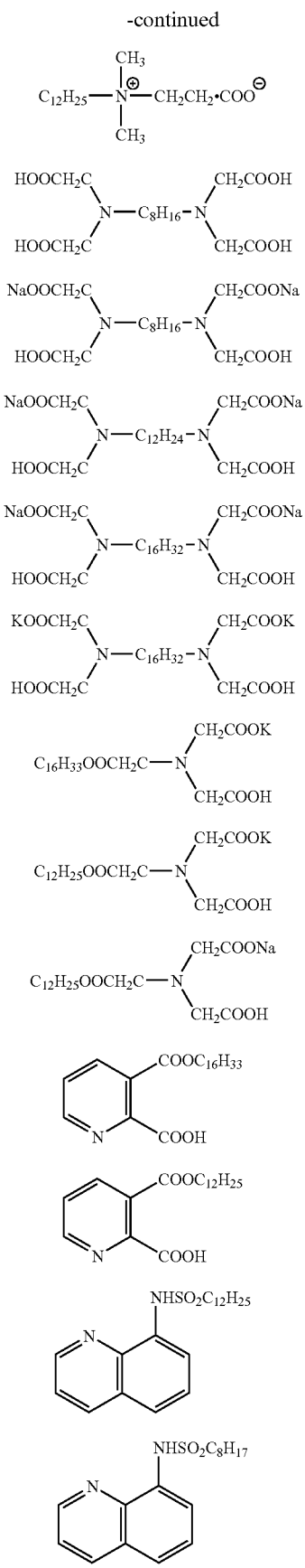
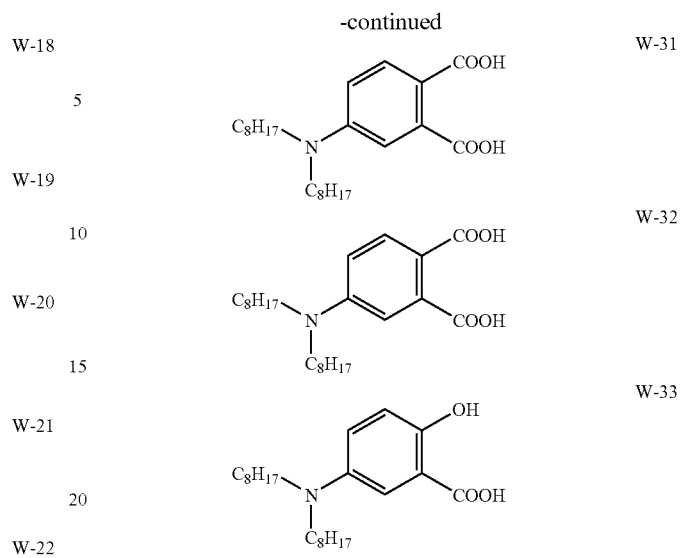

In the ink of the present invention, the amino acid derivative or metal chelating compound is contained in an amount of 0.01 to 20 wt %, preferably from 0.1 to 10 wt %, more preferably from 0.5 to 5 wt %.

The inkjet ink of the present invention preferably contains from 0.01 to 20 parts by weight, more preferably from 0.02 to 10 parts by weight of a dye, as the coloring agent, per 100 parts by weight of the ink. The concentration of dye in the ink jet ink is lower than that in the corresponding concentrated ink.

The concentrated ink of the present invention is defined to contain 2 parts by weight or more (preferably 20 parts by weight or less) of a dye as the coloring agent per 100 parts by weight of the ink. The concentrated ink preferably contains from 2.5 to 15 parts by weight of a dye per 100 parts by weight of the ink.

The production method of an inkjet ink comprising producing the ink described in 1) using the concentrated ink described in 2) includes, as one embodiment, a method of preparing a composition having a formulation excluding the dye in the formulation of the concentrated ink and diluting the concentrated ink with the composition, and a method of mixing the concentrated ink with another ink having a relatively low concentration of the dye.

The ink set of the present invention comprises the inkjet ink of the present invention or the concentrated inkjet ink of the present invention.

The ink for use in the ink set of the present invention is an ink obtained by dissolving a dye in water and/or an organic solvent. In particular, an aqueous solution-type ink using a water-soluble dye is preferred. The term "water-soluble dye" as used in the present invention means a dye, which dissolves in an amount of 2 wt % or more in distilled water at 20° C.

In the ink for use in the present invention, various dyes are used as the coloring agent. Examples thereof include the followings.

Examples of the yellow dye include aryl- or heteryl-azo dyes having a phenol, a naphthol, an aniline, a pyrazolone, a pyridone or an open chain-type active methylene compound as a coupling component; azomethine dyes having an open chain-type active methylene compound as a coupling component; methine dyes, for example, benzylidene dye and monomethine oxonol dye; and quinone-base dyes, for example, naphthoquinone dye and anthraquinone dye. Other examples of the dye species include quinophthalone dye, nitro.nitroso dye, acridine dye and acridinone dye. These dyes may be a dye which provides a yellow color for the first time when a part of the chromophore is dissociated. In such a case, the counter cation may be an inorganic cation, for example, alkali metal and ammonium, an organic cation, for example, pyridinium and quaternary ammonium salt, or a polymer cation having such a cation in the partial structure.

Examples of the magenta dye include aryl- or heteryl-azo dyes having a phenol, a naphthol or an aniline as a coupling component; azomethine dyes having a pyrazolone or a pyrazolotriazole as a coupling component; methine dyes, for example, arylidene dye, styryl dye, merocyanine dye and oxonol dye; carbonium dyes, for example, diphenylmethane dye, triphenylmethane dye and xanthene dye; quinone-base dyes, for example, naphthoquinone, anthraquinone and anthrapyridone; and condensed polycyclic dyes, for example, dioxazine dye. These dyes may be a dye, which provides a magenta color for the first time when a part of the chromophore is dissociated. In such a case, the counter cation may be an inorganic cation such as alkali metal and ammonium, an organic cation, for example, pyridinium and quaternary ammonium salt, or a polymer cation having such a cation in the partial structure.

Examples of the cyan dye include azomethine dyes, for example, indoaniline dye and indophenol dye; polymethine dyes, for example, cyanine dye, oxonol dye and merocyanine dye; carbonium dyes, for example, diphenylmethane dye, triphenylmethane dye and xanthene dye; phthalocyanine dyes; anthraquinone dyes; aryl- or heteryl-azo dyes having a phenol, a naphthol or an aniline as a coupling component; and indigo.thioindigo dyes. These dyes may be a dye, which provides a cyan color for the first time when a part of the chromophore is dissociated. In such a case, the counter cation may be an inorganic cation, for example, alkali metal and ammonium, an organic cation, for example, pyridinium and quaternary ammonium salt, or a polymer cation having such a cation in the partial structure.

A black dye, for example, polyazo dye can also be used.

A water-soluble dye, for example, direct dye, acid dye, food color, basic dye and reactive dye can also be used in combination. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

A pigment may also be used together with the dye.

As the pigment for use in the ink of the present invention, commercially available pigments and known pigments described in various literatures can be used. The literature includes *Colour Index*, compiled by The Society of Dyers and Colourists, *Kaitei Shin-Han Ganryo Binran (Revised New Handbook of Pigments)*, compiled by Nippon Ganryo Gijutsu Kyokai (1989), *Saishin Ganryo Oyo Gijutsu (Newest Pigment Application Technology)*, CMC Publishing Co., Ltd. (1986), *Insatsu Ink Gijutsu (Printing Ink Technology)*, CMC Publishing Co., Ltd. (1984), and W. Herbst and K. Hunger, *Industrial Organic Pigments*, VCH Verlagsgesellschaft (1993). Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene-base and perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acid or basic dye) and azine pigments. Specific examples of the inorganic pigment include yellow pigments, for example, C.I. Pigment Yellow 34, 37, 42 and 53, red pigments, for example, C.I. Pigment Red 101 and 108, blue pigments, for example, C.I. Pigment Blue 27, 29 and 17:1, black pigments, for example, C.I. Pigment Black 7 and magnetite, and white pigments, for example, C.I. Pigment White 4, 6, 18 and 21.

The pigments having a preferred color tone for the formation of an image include the followings. As the blue to cyan pigment, phthalocyanine pigments, anthraquinone-base indanthrone pigments (for example, C.I. Pigment Blue 60) and dyeing lake pigment-type triarylcarbonium pigments are preferred, and phthalocyanine pigments are most preferred (preferred examples thereof include copper phthalocyanine, for example, C.I. Pigment Blue 15:1, 15:2, 15:3, 15:4 and 15:6, monochloro or low chlorinated phthalocyanine, aluminum phthalocyanine, for example, pigments described in European Patent 860475, nonmetallic phthalocyanine, for example, C.I. Pigment Blue 16, and phthalocyanine with the center metal of Zn, Ni or Ti, and among these, C.I. Pigment Blue 15:3 and 15:4 and aluminum phthalocyanine are most preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type, for example, C.I. Pigment Yellow 1, 3, 74 and 98, disazo pigment-type, for example, C.I. Pigment Yellow 12, 13, 14, 16, 17 and 83, condensed azo-type, for example, C.I. Pigment 93, 94, 95, 128 and 155, and benzimidazolone-type, for example, C.I. Pigment Yellow 120, 151, 154, 156 and 180, and among these, those not using a benzidine-base compound as a raw material are more preferred), isoindoline.isoindolinone-base pigments (preferred examples thereof include C.I. Pigment Yellow 109, 110, 137 and 139,), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the ink of the present invention may be the above-described pigment as it is or a pigment after surface treatment. For the surface treatment, a method of coating the surface with resin or wax, a method of attaching a surfactant, and a method of binding a reactive substance (for example, a radical generated from a silane coupling agent, an epoxy compound, a polyisocyanate or a diazonium salt) to the pigment surface may be used and these are described in the following literatures and patents:

(1) *Kinzoku Sekken no Seishitsu to Oyo* (*Properties and Applications of Metal Soap*), Saiwai Shobo Co., ltd.;

(2) *Insatsu Ink Insatsu* (*Printing Ink Printing*), CMC Publishing Co., Ltd. (1984);

(3) *Saishin Ganryo Oyo Gijutsu* (*Newest Pigment Application Technology*), CMC Publishing Co., Ltd. (1986);

(4) U.S. Pat. Nos. 5,554,739 and 5,571,311; and (5) JP-A-9-151342 (the term "JP-A" as used herein means an "unexamined published Japanese patent application"), JP-A-10-140065, JP-A-10-292143 and JP-A-11-166145.

Particularly, self-dispersible pigments prepared by allowing a diazonium salt to act on carbon black described in U.S. Patents of (4) and capsulated pigments prepared by methods described in JP-A's of (5) are effective, because dispersion stability can be obtained without using an superfluous dispersant in the ink.

In the ink of the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In case of using the dispersant, a pigment derivative called synergist may also be added so as to accelerate the adsorption of dispersant to the pigment.

The particle size of the pigment which can be used in the ink of the present invention is, after the dispersion, preferably from 0.01 to 10 μm, more preferably from 0.05 to 1 μm.

As for the method of dispersing the pigment, known dispersion techniques used at the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Publishing Co., Ltd. (1986).

A surfactant, which may be contained, if desired, in the ink composition for inkjet recording of the present invention, is described below.

When a surfactant is incorporated into the ink composition for inkjet recording of the present invention to control the liquid properties of the ink, this provides excellent effects, for example, improvement in the ejection stability of ink, increase of the water resistance of image, and prevention of blurring of the printed ink.

Preferred examples of the surfactant, which is used in combination with the amino acid derivative or metal chelating compound of the present invention, include nonionic surfactants.

The surfactant content is from 0.001 to 15 wt %, preferably from 0.005 to 10 wt %, more preferably from 0.01 to 5 wt %, based on the ink.

The ink for inkjet recording of the present invention can be produced by dissolving and/or dispersing the above-described dye and amino acid derivative or metal chelating compound in an aqueous medium. The term "aqueous medium" as used in the present invention means a mixture of water and a slight amount of water-miscible organic solvent, where additives, for example, wetting agent (preferably surfactant), stabilizer and antiseptic are added, if desired. The dye for use in the present invention is preferably dissolved in the aqueous medium.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethyl-sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). The water-miscible organic solvents can be used in combination of two or more thereof.

In the case where the above-described dye is an oil-soluble dye, the ink for inkjet recording can be prepared by dissolving the oil-soluble dye in a high boiling point organic solvent and emulsification-dispersing the resolution in an aqueous medium.

The high boiling point organic solvent for use in the present invention has a boiling point of 150° C. or more, preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphonic acid (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid), alkylphosphoric acids (e.g., di-(2-ethylhexyl)phosphoric acid, diphenylphosphoric acid).

The high boiling point organic solvents may be used individually or as a mixture of plural kinds thereof (for example, tricresyl phosphate and dibutyl phthalate, trioctyl phosphate and di(2-ethylhexyl) sebacate, or dibutyl phthalate and poly(N-tert-butylacrylamide)).

Examples of the high boiling point organic solvent for use in the present invention, other than the above-described compounds, and/or synthesis method of the high boiling organic solvent are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in an amount of from 0.01 to 3.0 times, preferably from 0.01 to 1.0 times, based on the weight of the oil-soluble dye.

In the present invention, the oil-soluble dye and high boiling point organic solvent is used as emulsification-dispersion thereof in an aqueous medium. At the emulsification-dispersion, a low boiling point organic solvent may be used from the viewpoint of emulsifiability depending on the case. The low boiling point organic solvent is an organic solvent having a boiling point of about 30° C. to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsification dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, for example, surfactant, wetting agent, dye stabilizer, emulsification stabilizer, antiseptic and fungicide, can be added, if desired.

As an emulsification method, a method of adding the oil phase is added to the aqueous phase is ordinarily used, however, a so-called phase inversion emulsification method of adding dropwise the aqueous phase to the oil phase can also be preferably used.

In performing the emulsification dispersion of the present invention, various surfactants can be used. Preferred examples thereof include anionic surfactants, for example, fatty acid salt, alkylsulfate, alkylbenzene-sulfonate, alkylnaphthalenesulfonate, dialkylsulfosuccinate, alkylphosphate, naphthalenesulfonic acid-formalin condensate and polyoxyethylenealkylsulfate; and nonionic surfactants, for example, polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SUR-FYNOLS (produced by Air Products & Chemicals, Inc.), which is an acetylene-base polyoxyethylene oxide surfactant, is preferably used. In addition, amine oxide-type amphoteric surfactants, for example, N,N-dimethyl-N-alkylamine oxide are also preferred. Furthermore, surfactants described in JP-A-59-157636 (pages (37) to (38)) and *Research Disclosure*, No. 308119 (1989) can be used.

For the purpose of stabilizing the dispersion immediately after the emulsification, a water-soluble polymer may also be added in combination with the surfactant. As the water-soluble polymer, polyvinyl alcohol, polyvinylpyrrolidone, polyethylene oxide, polyacrylic acid, polyacrylamide, and copolymers thereof are preferably used. In addition, natural water-soluble polymers, for example, polysaccharide, casein and gelatin are also preferably used. Furthermore, for stabilization of the dye dispersion, a polymer, which does not substantially dissolve in an aqueous medium, can also be used in combination, for example, polyvinyl compound obtained by polymerization of acrylic acid esters, methacrylic acid esters, vinyl esters, acrylamides, methacrylamides, olefins, styrenes, vinyl ethers or acrylonitriles, polyurethane, polyester, polyamide, polyurea and polycarbonate. The polymer preferably contains $-SO_3^{2-}$ or $-COO^-$. In the case of using the polymer, which does not substantially dissolve in an aqueous medium, the polymer is preferably used in an amount of 20 wt % or less, more preferably 10 wt % or less, based on the high boiling point organic solvent.

In preparing aqueous ink by dispersing an oil-soluble dye and a high boiling point organic solvent according to emulsification dispersion, control of the particle size is particularly important. In order to increase color purity and density of an image formed by inkjet recording, it is essential to reduce the average particle size. The average particle size is preferably 1 µm or less, more preferably from 5 to 100 nm, in terms of the volume average particle size.

The volume average particle size and particle size distribution of the dispersed particles can be easily measured by a known method, for example, static light scattering method, dynamic light scattering method, centrifugal precipitation method and method described in *Jikken Kagaku Koza* (*Lecture of Experimental Chemistry*), 4th ed., pp. 417–418. For instance, the ink is diluted with distilled water such that the particle concentration in the ink becomes from 0.1 to 1 wt %, and the particle size can be easily measured by a commercially available volume average particle size measuring apparatus (for example, Microtrac UPA, manufactured by Nikkiso Co., Ltd.). The dynamic light scattering method utilizing a laser Doppler effect is particularly preferred, because even a small particle size can be measured.

The volume average particle size is an average particle size weighted with the particle volume and it is obtained by multiplying the diameter of individual particles with the volume of the particle and dividing the sum total of the obtained values by the total volume of the particles in the aggregation of particles. The volume average particle size is described in Soichi Muroi, *Koubunshi Latex no Kagaku* (*Chemistry of Polymer Latex*), page 119, Koubunshikankoukai Co., Ltd.

Also, it is revealed that the presence of coarse particles greatly affects the printing performance. More specifically, the coarse particle clogs a nozzle of head or even if the nozzle is not clogged, forms a soil to bring about failure or twist in the ejection of ink, whereby the printing performance is seriously affected. In order to prevent these troubles, it is important that when an ink is prepared, the number of particles having a particle size of 5 µm or more and the number of particles having a particle size of 1 µm or more are reduced to 10 or less and 1,000 or less, respectively, per 1 µl of ink.

For removing the coarse particles, a known method, for example, centrifugal separation or microfiltration can be used. The separation step may be performed immediately after the emulsification dispersion or may be performed immediately before the filling the ink in an ink cartridge after adding various additives, for example, wetting agent and surfactant to the emulsified dispersion.

A mechanically emulsifying apparatus can be used for effectively reducing the average particle size and eliminating coarse particles.

As the emulsifying apparatus, known devices, for example, simple stirrer, impeller stirring system, in-line stirring system, mill system (e.g., colloid mill) and ultrasonic system can be used, however, a high-pressure homogenizer is particularly preferably used.

The mechanism of high-pressure homogenizer is described in detail in U.S. Pat. No. 4,533,254 and JP-A-6-47264. Examples of the commercially available apparatus include Gaulin Homogenizer (manufactured by A. P. V Gaulin Inc.), Microfluidizer (manufactured by Microfluidex Inc.) and Altimizer (manufactured by Sugino Machine Ltd.).

A high-pressure homogenizer with a mechanism of pulverizing particles in an ultrahigh pressure jet stream described in U.S. Pat. No. 5,720,551 is particularly effective for the emulsification dispersion of the present invention. Examples of the emulsifying apparatus using the ultrahigh pressure jet stream include DeBEE2000 (manufactured by BEE International Ltd.).

In performing the emulsification by a high-pressure emulsification dispersing apparatus, the pressure is 50 MPa or more, preferably 60 MPa or more, more preferably 180 MPa or more.

A method of using two or more emulsifying devices, for example, emulsifying the dye solution in a stirring emulsifier and then passing it through a high-pressure homogenizer, is particularly preferred. Also, a method of once emulsification-dispersing the dye solution by such an emulsifying apparatus, adding additives, for example, wetting agent and surfactant, and then again passing the dispersion through a high-pressure homogenizer before the time of filling the ink into a cartridge is preferred.

In the case of containing a low boiling point organic solvent in addition to a high boiling point organic solvent, the low boiling point solvent is preferably removed in view of stability of the emulsified product and safety and health. For removing the low boiling point solvent, various known methods can be used depending on the kind of solvent. Examples thereof include evaporation, vacuum evaporation and ultrafiltration. The removal of the low boiling point organic solvent is preferably performed as soon as possible immediately after the emulsification.

In the ink composition for inkjet recording obtained by the present invention, additives, for example, drying inhibitor for preventing clogging due to drying of ink at the ejection port, permeation accelerator for attaining more successful permeation of ink into paper, ultraviolet absorbent, antioxidant, viscosity controlling agent, surface tension adjusting agent, dispersant, dispersion stabilizer, fungicide, rust inhibitor, pH adjusting agent, defoaming agent and chelating agent, can be appropriately The drying inhibitor for use in the present invention is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, for example, ethylene glycol monomethyl(or ethyl) ether, diethylene glycol monomethyl(or ethyl) ether and triethylene glycol monoethyl(or butyl) ether; heterocyclic compounds, for example, 2-pyrrolidone, N-methyl-2-pyrrolidone, 1,3-dimethyl-2-imidazolidinone and N-ethylmorpholine; sulfur-containing compounds, for example, sulfolane, dimethylsulfoxide and 3-sulfolene; polyfunctional compounds, for example, diacetone alcohol and diethanolamine; and urea derivatives. Among these, polyhydric alcohols, for example, glycerin and diethylene glycol are preferred. The drying inhibitors may be used individually or in combination of two or more thereof. The drying inhibitor is preferably contained in the ink in an amount of 10 to 50 wt %.

Examples of the permeation accelerator for use in the present invention include alcohols, for example, propanol, butanol, di(or tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator to the ink. The permeation accelerator is preferably used in the amount range of causing no blurring of printed letter or no print through.

Examples of the ultraviolet absorbent which can be used for improving the preservability of image in the present invention include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure*, No. 24239, and compounds capable of absorbing ultraviolet light and emitting fluorescent light, so-called fluorescent brightening agents, represented by stilbene-base compounds and benzoxazole-base compounds.

As the antioxidant used for improving the preservability of image in the present invention, various organic discoloration inhibitors and metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic compounds. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and specific examples thereof described in JP-A-62-215272 (pages 127 to 137) can be used.

Examples of the fungicide for use in the present invention include sodium dehydroacetate, sodium benzoate, sodium pyridinethion-1-oxide, ethyl p-hydroxybenzoate, 1,2-benzisothiazolin-3-one and a salt thereof. The fungicide is preferably used in the ink in an amount of 0.02 to 5.00 wt %.

These are described in detail in *Bokin Bobai Zai Jiten (Dictionary of Microbicides and Fungicides)*, compiled by Nippon Bokin Bobai Gakkai Jiten Henshu Iinkai.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. The rust inhibitor is preferably used in the ink in an amount of 0.02 to 5.00 wt %.

In the present invention, apart from the above-described surfactant, a nonionic, cationic or anionic surfactant is used as the surface tension adjusting agent. Examples of the anionic surfactant include fatty acid salt, alkylsulfate, alkylbenzenesulfonate, alkyl-naphthalenesulfonate, dialkylsulfosuccinate, alkylphosphate, naphthalenesulfonic acid-formalin condensate and polyoxyethylenealkylsulfate. Examples of the nonionic surfactant include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants, for example, N,N-dimethyl-N-alkylamine oxide are also preferred. Furthermore, surfactants described in JP-A-59-157636 (pages (37) to (38)) and *Research Disclosure*, No. 308119 (1989) can be used.

By using or not using such a surface tension adjusting agent, the surface tension of the ink of the present invention is preferably controlled in a range of from 20 to 60 mN/m, more preferably from 25 to 45 mN/m.

The viscosity of the ink for use in the present invention is preferably controlled 30 mPa·s or less, more preferably 20 mPa·s or less. For the purpose of controlling the viscosity, a viscosity controlling agent may be sometimes used. Examples of the viscosity controlling agent include celluloses, water-soluble polymers, for example, polyvinyl alcohol, and nonionic surfactants. These are described in detail in *Nendo Chosei Gijutsu (Viscosity Controlling Technology)*, Chap. 9, Gijutsu Joho Kyokai (1999), and *Inkjet Printer Yo Chemicals (98 Zoho)—Zairyo no Kaihatsu Doko·Tenbo Chosa—(Chemicals for Inkjet Printer (Enlarged Edition of 98)—Survey on Tendency·Prospect of Development of Materials—)*, pp. 162–174, CMC (1997).

In the present invention, if desired, the above-described various cationic, anionic and nonionic surfactants can be used as the dispersant or dispersion stabilizer, fluorine-base or silicone-base compounds can be used as the defoaming agent, and chelating agents represented by EDTA and the like can be used as the defoaming agent.

Recording paper and recording film for use in the image recording method of the present invention are described below. The support which can be used for the recording paper or recording film is produced, for example, from a chemical pulp, e.g., LBKP and NBKP, a mechanical pulp, e.g., GP, PGW, RMP, TMP, CTMP, CMP and CGP, or a waste paper pulp, e.g., DIP by mixing, if desired, conventionally known additives, for example, pigment, binder, sizing agent, fixing agent, cation agent and paper strength increasing agent, and then subjecting the mixture to paper making using various devices, for example, Fourdrinier paper machine and cylinder paper machine. Other than these supports, synthetic paper or plastic film may be used. Th thickness of the support is preferably from 10 to 250 μm and the basis weight is preferably from 10 to 250 g/m².

An image-receiving layer and a backcoat layer may be provided on the support as it is to produce an image-receiving material, or after a size press or anchor coat layer is provided using starch, polyvinyl alcohol or the like, an image-receiving layer and a backcoat layer may be provided to produce an image-receiving material. Furthermore, the support may be subjected to a planarizing treatment by a calendering device, for example, machine calender, TG calender and soft calender.

In the present invention, the support is preferably paper both surfaces of which are laminated with polyolefin (for example, polyethylene, polystyrene, polyethylene terephthalate, polybutene or a copolymer thereof) or a plastic film. In the polyolefin, a white pigment (for example, titanium oxide or zinc oxide) or a color tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments, for example, calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments, for example, styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic anhydride obtained by a dry production method, or a silicic acid hydrate obtained by a wet production method. A silicic acid hydrate is preferred. Two or more of these pigments may be used in combination.

Examples of the aqueous binder contained in the image-receiving layer include water-soluble polymers, for example, polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers, for example, styrene butadiene latex and acryl emulsion. The aqueous binders can be used individually or in combination of two or more thereof. Among these, polyvinyl alcohol and silanol-modified polyvinyl alcohol are preferred in the present invention in view of adhesion to the pigment and adherence of the image-receiving layer to the support.

The image-receiving layer may contain a mordant, a water-proofing agent, a light fastness enhancer, a surfactant, a hardening agent and other additives in addition to the pigment and the aqueous binder.

The mordant added to the image-receiving layer is preferably immobilized and for such a purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in JP-A-1-161236 is used, an image having excellent image quality is obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride, cation polyacrylamide and colloidal silica. Among the cationic resins, polyamidopolyamine epichlorohydrin is preferred. The content of the cationic resin is preferably from 1 to 15 wt %, more preferably from 3 to 10 wt %, based on the total solid content of the image-receiving layer.

Examples of the light fastness enhancer include zinc sulfate, zinc oxide, hindered amine-base antioxidant, and benzotriazole-base ultraviolet absorbent, for example, benzophenone. Among these, zinc sulfate is preferred.

The surfactant functions as a coating aid, a adherence improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, materials described in JP-A-1-161236 (page 222) can be used.

Other examples of the additive added to the image-receiving layer include a pigment dispersant, a thickener, a defoaming agent, a dye, a fluorescent brightening agent, an antiseptic, a pH adjusting agent and a matting agent. The image-receiving layer may be composed of one layer or two layers.

In the recording paper or film, a backcoat layer may also be provided. Examples of the component which can be added to the backcoat layer include a white pigment, an aqueous binder and other components.

Examples of the white pigment contained in the backcoat layer include inorganic white pigments, for example, precipitated calcium carbonate light, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide; and organic pigments, for example, styrene-base plastic pigment, acryl-base plastic pigment, polyethylene, microcapsule, urea resin and melamine resin.

Examples of the aqueous binder contained in the backcoat layer include water-soluble polymers, for example, styrene/maleic acid salt copolymer, styrene/acrylic acid salt copolymer, polyvinyl alcohol, silanol-modified polyvinyl alcohol, starch, cationized starch, casein, gelatin, carboxymethyl cellulose, hydroxyethyl cellulose and polyvinylpyrrolidone; and water-dispersible polymers, for example, styrene butadiene latex and acryl emulsion. Other examples of the component contained in the backcoat layer include a defoaming agent, a foam inhibitor, a dye, a fluorescent brightening agent, an antiseptic and a water-proofing agent.

To a constituent layer (including the backcoat layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or below) is added to a layer containing a mordant, the layer can be prevented from cracking or curling. The curling can also be prevented by adding a polymer fine particle dispersion having a high glass transition temperature to the backcoat layer.

According to the present invention, the ink-jet recording system is not limited and a known system may be used, for example, an electric charge controlling system of ejecting the ink by utilizing the electrostatic induction force, a drop-on-demand system (pressure pulse system) utilizing an oscillation pressure of a piezoelectric element, an acoustic inkjet system wherein electric signals are converted into acoustic beams, and the ink is irradiated with the beams to eject the ink using the radiation pressure, and a thermal inkjet (bubble jet) system of heating the ink to form a bubble and ejecting the ink utilizing the generated pressure.

The inkjet recording system includes a system of ejecting a large number of small-volume ink droplets of so-called photo ink having a low concentration, a system of improving the image quality by using a plurality of inks having substantially the same color hue but differing in the concentration, and a system using a colorless transparent ink.

The present invention is described below by referring to Examples, however, the present invention should not be construed as being limited thereto.

EXAMPLE 1

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare Light Magenta Ink LM-101.

[Formulation of Light Magenta Ink LM-101]

(Solid Contents)

| Magenta Dye (MD-1) | 7.5 g/liter |
| Urea | 37 g/liter |

(Liquid Components)

| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Also, Magenta Ink M-101 was prepared by increasing Magenta Dye (MD-1) to 23 g in the formulation above.

[Formulation of Magenta Ink M-101]

(Solid Contents)

| Magenta Dye (MD-1) | 23 g/liter |
| Urea | 37 g/liter |

(Liquid Components)

| Diethylene glycol (DEG) | 140 g/liter |
| Glycerin (GR) | 120 g/liter |
| Triethylene glycol monobutyl ether (TGB) | 120 g/liter |
| Triethanolamine | 6.9 g/liter |
| Surfynol STG | 10 g/liter |

Magenta Dye (MD-1)

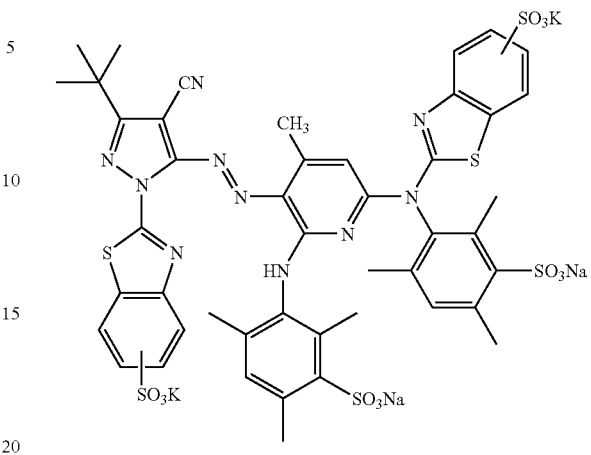

Light Magenta Inks LM-102 to LM-108 and Magenta Inks M-102 to M-108 each having the same composition as Light Magenta Ink LM-101 or Magenta Ink M-101 except for adding the additive shown in Table 1 below were produced.

TABLE 1

| | Additive |
|---|---|
| LM-101, M-101 (Comparative Example) | none |
| LM-102, M-102 (Comparative Example) | 10 g/liter of POEP-1 to LM-101 and M-101 |
| LM-103, M-103 (Comparative Example) | 10 g/liter of POEN-1 to LM-101 and M-101 |
| LM-104, M-104 (Invention) | 10 g/liter of W-2 to LM-101 and M-101 |
| LM-105, M-105 (Invention) | 10 g/liter of W-3 to LM-101 and M-101 |
| LM-106, M-106 (Invention) | 10 g/liter of W-8 to LM-101 and M-101 |
| LM-107, M-107 (Invention) | 10 g/liter of W-10 to LM-101 and M-101 |
| LM-108, M-108 (Invention) | 10 g/liter of W-12 to LM-101 and M-101 |

POEP-1: Polyoxyethylene nonylphenyl ether (PEO chain average number: 30)
POEN-1: Polyoxyethylene naphthyl ether (PEO chain average number: 50)

These inks each was filled in a magenta ink cartridge and a light magenta ink cartridge of an inkjet printer PM950C (manufactured by Seiko Epson Corporation) and using the inks of PM-950C for other colors, a magenta monochromatic image was printed. The image-receiving sheet where the image was printed was inkjet paper Photo Gloss Paper EX manufactured by Fuji Photo Film Co., Ltd. The image obtained was evaluated on the fastness under high humidity conditions.

(Evaluation Test)

In the evaluation of blurring of the image under high humidity conditions, a printing pattern was prepared. This printing pattern included four magenta square patterns each having a size of 3 cm×3 cm, arrayed to form a two-row and two-column table shape with a 1-mm white clearance between the respective square patterns. After the printing pattern was stored under conditions of 25° C. and 90% RH for 72 hours, blurring of the magenta dye in the white clearance was observed. The increase of magenta density to the magenta density immediately after printing in the white clearance was measured by a magenta filter of Status A, and a case where the increase of magenta density was less than 0.01 was rated A, a case where the increase of magenta density was from 0.01 to 0.05 was rated B, and a case where the increase of magenta density was more than 0.05 was rated C.

The results obtained are shown in Table 2 below.

TABLE 2

|  | M Blurring |
|---|---|
| Genuine ink of EPSON (PM-950C) | B |
| LM-101, M-101 (Comparative Example) | C |
| LM-102, M-102 (Comparative Example) | C |
| LM-103, M-103 (Comparative Example) | C |
| LM-104, M-104 (Invention) | A |
| LM-105, M-105 (Invention) | A |
| LM-106, M-106 (Invention) | A |
| LM-107, M-107 (Invention) | A |
| LM-108, M-108 (Invention) | A |

As seen from the results shown in Table 2, the systems using the ink set of the present invention are superior to all Comparative Examples in view of the magenta blurring.

EXAMPLE 2

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare Light Cyan Ink LC-101.

[Formulation of Light Cyan Ink LC-101]

(Solid Contents)

| Cyan Dye (CD-1) | 17.5 g/liter |
|---|---|
| Proxel | 3.5 g/liter |

(Liquid Components)

| Diethylene glycol | 150 g/liter |
|---|---|
| Glycerin | 130 g/liter |
| Triethylene glycol monobutyl ether | 130 g/liter |
| Triethanolamine | 6.9 g/liter |
| Surfynol STG (nonionic surfactant) | 10 g/liter |

Also, Cyan Ink C-101 was prepared by increasing Cyan Dye (CD-1) to 68 g in the formulation above.

[Formulation of Cyan Ink C-101]

(Solid Contents)

| Cyan Dye (CD-1) | 68 g/liter |
|---|---|
| Proxel | 3.5 g/liter |

(Liquid Components)

| Diethylene glycol | 150 g/liter |
|---|---|
| Glycerin | 130 g/liter |
| Triethylene glycol monobutyl ether | 130 g/liter |
| Triethanolamine | 6.9 g/liter |
| Surfynol STG | 10 g/liter |

Cyan Dye (CD-1)

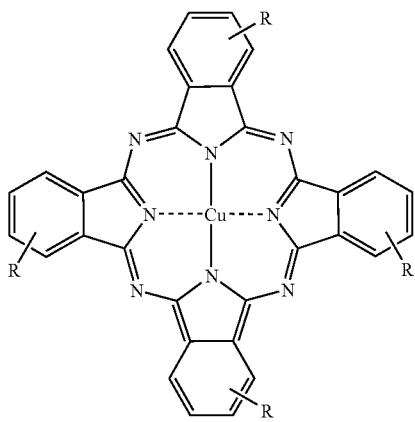

R: $SO_2CH_2CH_2CH_2SO_3Li$

Light Cyan Inks LC-102 to LC-108 and Cyan Inks C-102 to C-108 each having the same composition as Light Cyan Ink LC-101 or Cyan Ink C-101 except for adding the additive shown in Table 3 below were produced.

TABLE 3

| | Additive |
|---|---|
| LC-101, C-101 (Comparative Example) | none |
| LC-102, C-102 (Comparative Example) | 10 g/liter of POEP-1 to LC-101 and C-101 |
| LC-103, C-103 (Comparative Example) | 10 g/liter of POEN-1 to LC-101 and C-101 |
| LC-104, C-104 (Invention) | 10 g/liter of W-2 to LC-101 and C-101 |
| LC-105, C-105 (Invention) | 10 g/liter of W-3 to LC-101 and C-101 |
| LC-106, C-106 (Invention) | 10 g/liter of W-7 to LC-101 and C-101 |
| LC-107, C-107 (Invention) | 10 g/liter of W-11 to LC-101 and C-101 |
| LC-108, C-108 (Invention) | 10 g/liter of W-14 to LC-101 and C-101 |

POEP-1: Polyoxyethylene nonylphenyl ether (PEO chain average number: 30)
POEN-1: Polyoxyethylene naphthyl ether (PEO chain average number: 50)

These inks each was filled in a cyan ink cartridge and a light cyan ink cartridge of an inkjet printer PM950C manufactured by Seiko Epson Corporation and the same evaluation as in Example 1 was performed.

The results obtained are shown in Table 4 below.

TABLE 4

|  | C Blurring |
|---|---|
| Genuine ink of EPSON (PM-950C) | B |
| LC-101, C-101 (Comparative Example) | C |
| LC-102, C-102 (Comparative Example) | C |
| LC-103, C-103 (Comparative Example) | C |
| LC-104, C-104 (Invention) | A |
| LC-105, C-105 (Invention) | A |
| LC-106, C-106 (Invention) | A |

TABLE 4-continued

| | C Blurring |
|---|---|
| LC-107, C-107 (Invention) | A |
| LC-108, C-108 (Invention) | A |

As seen from the results shown in Table 4, the systems using the ink set of the present invention are superior to all Comparative Examples in view of the cyan blurring.

EXAMPLE 3

Light Magenta Inks LM-109 to LM-115 and Magenta Inks M-109 to M-115 each having the same composition as Light Magenta Ink LM-101 or Magenta Ink M-101 of Example 1 except for adding the additive shown in Table 5 below were produced.

TABLE 5

| | Additive |
|---|---|
| LM-101, M-101 (Comparative Example) | none |
| LM-109, M-109 (Comparative Example) | 10 g/liter of POEP-1 to LM-101 and M-101 |
| LM-110, M-110 (Comparative Example) | 10 g/liter of POEN-1 to LM-101 and M-101 |
| LM-111, M-111 (Invention) | 10 g/liter of W-22 to LM-101 and M-101 |
| LM-112, M-112 (Invention) | 10 g/liter of W-23 to LM-101 and M-101 |
| LM-113, M-113 (Invention) | 10 g/liter of W-25 to LM-101 and M-101 |
| LM-114, M-114 (Invention) | 10 g/liter of W-20 to LM-101 and M-101 |
| LM-115, M-115 (Invention) | 10 g/liter of W-22 to LM-101 and M-101 |

POEP-1: Polyoxyethylene nonylphenyl ether (PEO chain average number: 30)
POEN-1: Polyoxyethylene naphthyl ether (PEO chain average number: 50)

These inks were evaluated on the image fastness in the same manner as in Example 1.

The results obtained are shown in Table 6 below.

TABLE 6

| | M Blurring |
|---|---|
| Genuine ink of EPSON (PM-950C) | B |
| LM-101, M-101 (Comparative Example) | C |
| LM-109, M-109 (Comparative Example) | C |
| LM-110, M-110 (Comparative Example) | C |
| LM-111, M-111 (Invention) | A |
| LM-112, M-112 (Invention) | A |
| LM-113, M-113 (Invention) | A |
| LM-114, M-114 (Invention) | A |
| LM-115, M-115 (Invention) | A |

As seen from the results shown in Table 6, the systems using the ink set of the present invention are superior to all Comparative Examples in view of the magenta blurring.

EXAMPLE 4

Light Cyan Ink LC-101a and Cyan Ink C-101a were prepared in the same manner as in Light Cyan Ink LC-101 and Cyan Ink C-101 of Example 2 except for using Cyan Dye (CD-2) in place of Cyan Dye (CD-1) respectively.

Cyan Dye (CD-2)

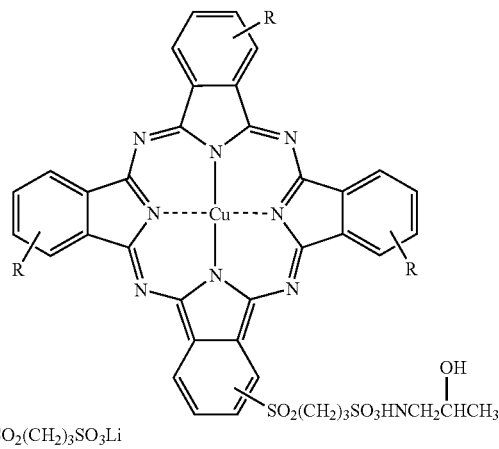

R: $SO_2(CH_2)_3SO_3Li$

Light Cyan Inks LC-109 to LC-115 and Cyan Inks C-109 to C-115 each having the same composition as Light Cyan Ink LC-101a or Cyan Ink C-101a except for adding the additive shown in Table 7 below were produced.

TABLE 7

| | Additive |
|---|---|
| LC-101a, C-101a (Comparative Example) | none |
| LC-109, C-109 (Comparative Example) | 10 g/liter of POEP-1 to LC-101 and C-101 |
| LC-110, C-110 (Comparative Example) | 10 g/liter of POEN-1 to LC-101 and C-101 |
| LC-111, C-111 (Invention) | 10 g/liter of W-22 to LC-101 and C-101 |
| LC-112, C-112 (Invention) | 10 g/liter of W-23 to LC-101 and C-101 |
| LC-113, C-113 (Invention) | 10 g/liter of W-25 to LC-101 and C-101 |
| LC-114, C-114 (Invention) | 10 g/liter of W-21 to LC-101 and C-101 |
| LC-115, C-115 (Invention) | 10 g/liter of W-24 to LC-101 and C-101 |

POEP-1: Polyoxyethylene nonylphenyl ether (PEO chain average number: 30)
POEN-1: Polyoxyethylene naphthyl ether (PEO chain average number: 50)

Using these inks, the same evaluation as in Example 1 was performed.

The results obtained are shown in Table 8 below.

TABLE 8

| | C Blurring |
|---|---|
| Genuine ink of EPSON (PM-950C) | B |
| LC-101a, C-101a (Comparative Example) | C |
| LC-109, C-109 (Comparative Example) | C |
| LC-110, C-110 (Comparative Example) | C |
| LC-111, C-111 (Invention) | A |
| LC-112, C-112 (Invention) | A |
| LC-113, C-113 (Invention) | A |
| LC-114, C-114 (Invention) | A |
| LC-115, C-115 (Invention) | A |

As seen from the results shown in Table 8, the systems using the ink set of the present invention are superior to all Comparative Examples in view of the cyan blurring.

According to the present invention, an inkjet ink, a production method of inkjet ink, an inkjet ink set and an inkjet recording method, which are ensured with less generation of blurring of an image even under high humidity conditions, can be obtained.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An inkjet ink comprising a dye, water, a water-miscible organic solvent and at least one compound selected from an amino acid derivative containing an oil-soluble group having 6 or more carbon atoms and a metal chelating compound containing an oil-soluble group having 6 or more carbon atoms, wherein the amino acid derivative is a compound represented by the following formula (A):

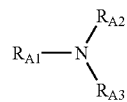

Formula (A)

wherein $R_{A1}$ represents an alkyl group having 6 or more carbon atoms, and $R_{A2}$ and $R_{A3}$ each represent an alkyl group, a carboxyalkyl group or a sulfoalkyl group, provided that at least one of $R_{A2}$ and $R_{A3}$ is a carboxyalkyl group or a sulfoalkyl group.

2. A concentrated inkjet ink comprising a dye, water, a water-miscible organic solvent and at least compound selected from an amino acid derivative containing an oil-soluble group having 6 or more carbon atoms and a metal chelating compound containing an oil-soluble group having 6 or more carbon atoms, wherein the amino acid derivative is a compound represented by the following formula (A):

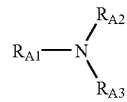

Formula (A)

wherein $R_{A1}$ represents an alkyl group having 6 or more carbon atoms, and $R_{A2}$ and $R_{A3}$ each represent an alkyl group, a carboxyalkyl group or a sulfoalkyl group, provided that at least one of $R_{A2}$ and $R_{A3}$ is a carboxyalkyl group or a sulfoalkyl group.

3. A method of producing the inkjet ink as claimed in claim 1 comprising diluting a concentrated inkjet ink comprising a dye, water, a water-miscible organic solvent and at least one compound selected from an amino acid derivative containing an oil-soluble group having 6 or more carbon atoms and a metal chelating compound containing an oil-soluble group having 6 or more carbon atoms, wherein the amino acid derivative is a compound represented by the following formula (A):

Formula (A)

wherein $R_{A1}$ represents an alkyl group having 6 or more carbon atoms, and $R_{A2}$ and $R_{A3}$ each represent an alkyl group, a carboxyalkyl group or a sulfoalkyl group, provided that at least one of $R_{A2}$ and $R_{A3}$ is a carboxyalkyl group or a sulfoalkyl group.

4. An ink set for inkjet recording method comprising the inkjet ink as claimed in claim 1.

5. An ink set for inkjet recording method comprising the concentrated inkjet ink as claimed in claim 2.

6. An inkjet recording method comprising recording an image by an inkjet printer using the inkjet ink as claimed in claim 1.

7. An inkjet recording method comprising recording an image by an inkjet printer using the concentrated inkjet ink as claimed in claim 2.

8. An inkjet recording method comprising recording an image by an inkjet printer using the ink set as claimed in claim 4.

9. An inkjet recording method comprising recording an image by an inkjet printer using the ink set as claimed in claim 5.

* * * * *